United States Patent
Mallik et al.

(10) Patent No.: US 10,028,332 B2
(45) Date of Patent: Jul. 17, 2018

(54) HIERARCHICAL CLUSTERING FRAMEWORK FOR INTER-CELL MIMO SYSTEMS

(75) Inventors: Siddhartha Mallik, San Diego, CA (US); Jilei Hou, San Diego, CA (US); Amir Farajidana, San Diego, CA (US); Tingfang Ji, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 545 days.

(21) Appl. No.: 12/541,038

(22) Filed: Aug. 13, 2009

(65) Prior Publication Data

US 2010/0041411 A1 Feb. 18, 2010

Related U.S. Application Data

(60) Provisional application No. 61/089,435, filed on Aug. 15, 2008.

(51) Int. Cl.
*H04W 88/08* (2009.01)

(52) U.S. Cl.
CPC ................................ *H04W 88/08* (2013.01)

(58) Field of Classification Search
CPC ..... H04W 16/02; H04W 16/10; H04W 16/12; H04W 16/32; H04W 88/08
USPC .......................................... 370/312; 455/501
See application file for complete search history.

(56) References Cited

U.S. PATENT DOCUMENTS

| | | | |
|---|---|---|---|
| 5,613,198 A * | 3/1997 | Ahmadi et al. | ............... 370/337 |
| 5,754,959 A | 5/1998 | Ueno et al. | |
| 5,898,683 A | 4/1999 | Matsumoto et al. | |
| 6,650,900 B1 | 11/2003 | Chavez, Jr. et al. | |
| 6,763,236 B2 | 7/2004 | Siren | |
| 6,850,190 B2 | 2/2005 | Ryu et al. | |
| 7,460,549 B1 | 12/2008 | Cardei et al. | |
| 7,565,151 B2 | 7/2009 | Sano | |
| 7,894,371 B2 | 2/2011 | Bonta et al. | |
| 7,924,734 B2 | 4/2011 | Pujet et al. | |
| 8,068,471 B2 | 11/2011 | Kim et al. | |
| 8,155,661 B2 | 4/2012 | Gerlach et al. | |
| 8,315,225 B2 | 11/2012 | Xu et al. | |
| 8,320,937 B2 | 11/2012 | Bolin | |

(Continued)

FOREIGN PATENT DOCUMENTS

| | | |
|---|---|---|
| CN | 1870461 A | 11/2006 |
| CN | 1893308 A | 1/2007 |

(Continued)

OTHER PUBLICATIONS

Texas Instruments "Network MIMO Precoding", 3GPP TSG RAN WG1 #53bis, R1-082497, Jun. 30-Jul. 4 2008, entire document.*

(Continued)

*Primary Examiner* — Joseph A Bednash

(74) *Attorney, Agent, or Firm* — Qualcomm/Norton Rose Fulbright US LLP

(57) ABSTRACT

A method for wireless communications is provided. The method includes forming a first set of wireless components into a master cluster that provides upper level service functionality to a subset of user devices. The method includes forming a second set of wireless components into a nested cluster that is associated with the master cluster, where the nested cluster provides data transfer to and from the subset of user devices.

23 Claims, 11 Drawing Sheets

(56) References Cited

U.S. PATENT DOCUMENTS

| | | | |
|---|---|---|---|
| 8,442,143 | B2 | 5/2013 | Lee et al. |
| 8,446,872 | B2 | 5/2013 | Choi et al. |
| 8,457,642 | B2 | 6/2013 | Comeau et al. |
| 2002/0024943 | A1 | 2/2002 | Karaul et al. |
| 2003/0186710 | A1 | 10/2003 | Muhonen et al. |
| 2004/0067735 | A1 | 4/2004 | Lobley |
| 2006/0014554 | A1* | 1/2006 | Gerlach .................. 455/501 |
| 2006/0072501 | A1 | 4/2006 | Toshimitsu et al. |
| 2006/0092883 | A1 | 5/2006 | Lee et al. |
| 2007/0280166 | A1 | 12/2007 | Jung et al. |
| 2007/0280264 | A1* | 12/2007 | Milton et al. .......... 370/395.31 |
| 2009/0003266 | A1* | 1/2009 | Stolyar et al. ............. 370/328 |
| 2009/0047960 | A1 | 2/2009 | Gunnarsson et al. |
| 2009/0082020 | A1 | 3/2009 | Ch'ng et al. |
| 2009/0131055 | A1 | 5/2009 | Wang et al. |
| 2009/0147736 | A1* | 6/2009 | Chen ............... H04W 72/082 |
| | | | 370/329 |
| 2009/0161688 | A1 | 6/2009 | Park et al. |
| 2009/0181708 | A1* | 7/2009 | Kim et al. ................. 455/501 |
| 2009/0247159 | A1 | 10/2009 | Flore et al. |
| 2009/0264130 | A1 | 10/2009 | Catovic et al. |
| 2009/0312027 | A1 | 12/2009 | Foschini et al. |
| 2010/0027456 | A1* | 2/2010 | Onggosanusi et al. ...... 370/312 |
| 2010/0035555 | A1 | 2/2010 | Bala et al. |
| 2010/0042716 | A1 | 2/2010 | Farajidana et al. |
| 2011/0028171 | A1 | 2/2011 | Guo et al. |
| 2011/0085460 | A1 | 4/2011 | Zhang et al. |
| 2011/0159886 | A1 | 6/2011 | Kangas et al. |
| 2011/0200029 | A1 | 8/2011 | Farmandar et al. |
| 2011/0294527 | A1 | 12/2011 | Brueck et al. |
| 2012/0096234 | A1 | 4/2012 | Jiang et al. |
| 2012/0113950 | A1 | 5/2012 | Skov et al. |
| 2012/0135766 | A1 | 5/2012 | Garavaglia et al. |
| 2012/0264466 | A1 | 10/2012 | Vainola |
| 2012/0289275 | A1 | 11/2012 | Li et al. |

FOREIGN PATENT DOCUMENTS

| | | |
|---|---|---|
| CN | 101001414 A | 7/2007 |
| EP | 0771127 A2 | 5/1997 |
| EP | 1113689 A2 | 7/2001 |
| EP | 1713206 A1 | 10/2006 |
| EP | 1742382 A2 | 1/2007 |
| EP | 1903816 A1 | 3/2008 |
| JP | 7298340 A | 11/1995 |
| JP | 9102977 A | 4/1997 |
| JP | 2001275145 A | 10/2001 |
| JP | 2006033826 A | 2/2006 |
| JP | 2006101497 A | 4/2006 |
| KR | 20060050076 A | 5/2006 |
| TW | 200820653 A | 5/2008 |
| WO | WO9853633 A1 | 11/1998 |
| WO | WO0064213 A1 | 10/2000 |
| WO | WO02080458 A1 | 10/2002 |
| WO | WO03069936 A1 | 8/2003 |
| WO | WO-2006028547 A1 | 3/2006 |
| WO | 2007087217 A1 | 8/2007 |
| WO | WO-2007124112 A2 | 11/2007 |
| WO | WO2008011149 A2 | 1/2008 |
| WO | WO-2008019706 A1 | 2/2008 |
| WO | WO2009124083 A1 | 10/2009 |
| WO | WO2009130582 A1 | 10/2009 |

OTHER PUBLICATIONS

T-Mobile Intl., Candidate Technologies for LTE-Advanced, REV-080047, Apr. 7-8, 2008, entire document.*
Motorola LTE Advanced Technical Proposals, REV-080011, Apr. 2008, entire document.*
ETRI, "Coordinated multi-cell transmission for LTE-Advanced Downlink", R1-082896, Aug. 18, 2008, entire document, intervening reference.*
NTT DoCoMo, Proposals for LTE-Advanced Technologies, 3GPP TSG RAN WG1 Meeting 53bis, R1-082575, Jun. 30-Jul. 4, 2008, entire document.*
International Preliminary Report on Patentability of PCT/US2009/053924, dated Feb. 15, 2011.*
"Draft Agenda", 3GPP TSG RAN WG1 Meeting #54, R1-082770, Jeju, South Korea, Aug. 18-22, 2008.*
Listing of www.3gpp.org—/ftp.tsg_ran/wg1_rl1/TSGR1_54/Docs retrieved from web on May 20, 2014.*
LG Electronics, "Network MIMO in LTE-Advanced", 3GPP TSG RAN WG1 Meeting #54, R1-082942, Jeju, South Korea Aug. 18-22, 2008.*
Samsung, "Inter-Cell Interference Mitigation Through limited coordination", 3GPP TSG RAN WG1 Meeting #54, R1-082886, Jeju, South Korea Aug. 18-22, 2008.*
Nortel, "Discussion and Link Level Simulation Results on LTE-A Downlink Multi-site MIMO Cooperation", 3GPP TSG-RAN Working Group 1 Meeting #55, R1-084465, Prague, Czech Republic, Nov. 10-14, 2008.*
Molisch et al. "Base Station Cooperation", IEEE 802.16 Broadband Wireless Access Working Group, IEEE C80216m-08_817, Jul. 7, 2008.*
Liu et al., "Multi-cell MIMO Schemes for IEEE 802.16m", IEEE 802.16 Broadband Wireless Access Working Group , IEEE C802.16m-08/632, Jul. 7, 2008.*
LG Electronics, Network MIMO in LTE-Advanced, 3GPP TSG-RAN WG1, Meeting #54, Jeju, South Korea, Aug. 18-22, 2008, R1-082942.*
Huawei, "Inter-eNB and Intra-eNB Schemes for CoMP in LTE-Advanced", 3GPP TSG-RAN WG1#54, Jeju, Korea, Aug. 18-22, 2008, R1-083050.*
Marsch et al. "A Framework for Determining Realistic Capacity Bounds for Distributed Antenna Systems", Proceedings of the IEEE Information Theory Workshop (ITW'06), Chengdu, China, Oct. 2006.*
T-Mobile Intl. "Candidate Technologies for LTE-Advanced" REV-080047, 3GPP RAN Workshop on IMT-Advanced, Shenzen, China, Apr. 7-8, 2008.*
Marsch et al., "A Decentralized Optimization Approach to Backhaul-Constrained Distributed Antenna Systems", Mobile and Wireless Communications Summit, 2007.*
Alcatel Shanghai Bell et al. "Collaborative MIMO for LTE-A downlink", 3GPP TSG RAN WG1 Meeting #53bis, Warsaw, Poland, Jun. 30-Jul. 4, 2008, R1-082501.*
International Search Report and Written Opinion—PCT/US2009/053924—ISA/EPO—dated Dec. 14, 2009.
3GPP TR 25.996 v.7.0.0, "Spatial channel model for multiple input multiple output (MIMO) simulations (Release 7)", Jun. 2007, pp. 1-40.
3GPP TS 36.300 V8.7.0: Evolved Universal Terrestrial Radio Access (E-UTRA) and Evolved Universal Terrestrial Radio Access Network (E-UTRAN); Overall description; Stage 2, Release 8, Dec. 2008, pp. 1-144.
3GPP TS 36.300 V9.0.0 (Jun. 2009), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).
3GPP TS 36.300 v9.4.0, "Evolved Universal Terrestrial Radio Access (EUTRA) Overall description; Stage 2 (Release 9)", Jun. 2010, pp. 1-171.
3GPP TS 36.331 V8.4.0: 3rd Generation Partnership Project; Technical Specification Group Radio Access Network; Evolved Universal Terrestrial Radio Access (E-UTRA) Radio Resource Control (RRC); Protocol specification (Release 8) (Dec. 2008).
3GPP TSG RAN WG1 #55bis, R1-090237: Setup of CoMP cooperation areas, Nokia Siemens Networks, Nokia, Ljubljana, Slovenia, Jan. 12-16, 2009, pp. 1-4.
3GPP TSG RAN WG1 #55bis, R1-090314: Investigation on Coordinated Multipoint Transmission Schemes in LTE-Advanced Downlink, NTT DoCoMo, Ljubljana, Slovenia, Jan. 12-16, 2009, slides 1-13.

(56) References Cited

OTHER PUBLICATIONS

3GPP TSG RAN WG1 #55bis, R1-090335: CoMP Scheme and System Level Performance Evaluation for LTE-A, CMCC , Ljubljana, Slovenia, Jan. 12-Jan. 16, 2009, pp. 1-10.
3GPP TSG RAN WG1 #56, R1-090657: Dynamic Cell Clustering for CoMP, LG Electronics, Athens, Greece, Feb. 9-13, 2009, pp. 1-3.
3GPP TSG RAN WG1 #56, R1-090725: Setup of CoMP cooperation areas, Nokia Siemens Networks, Nokia, Athens, Greece, Feb. 9-13, 2009, pp. 1-4.
3GPP TSG RAN WG1 #56, R1-090745: Cell Clustering in CoMP Transmission/Reception, Nortel, Athens, Greece, Feb. 9-13, 2009, pp. 1-4.
3GPP TSG RAN WG1 #56, R1-090793: Coordinated Multi-Point Transmission—Coordinated Beamforming and Results, Motorola, Athens, Greece, Feb. 9-13, 2009, pp. 1-4.
3GPP TSG RAN WG1 #56, R1-090922: Downlink CoMP-MU-MIMO transmission Schemes, CMCC, Athens, Greece, Feb. 9-13, 2009, pp. 1-8.
3GPP TSG RAN WG1 Meeting #56, R1-090823: Discussion on Timing Advance issue in CoMP & Text Proposal, Huawei, RITT, Texas Instruments, CMCC, Athens, Greece, Feb. 9-13, 2009, pp. 1-9.
3GPP TSG RAN WG1 meeting #57, R1-091687: Discussion on the relation between CoMP cooperating set and CoMP reporting set, NEC Group, May 4-8, 2009, pp. 1-3.
3GPP TSG RAN WG1 meeting #57, R1-091903: Adaptive Cell Clustering for CoMP in LTE-A, Hitachi, May 4-8, 2009, pp. 1-6.
3rd Generation Partnership Project; Technical Specification Group Radio Access Network; Evolved Universal Terrestrial Radio Access (E-UTRA); Further advancements for E-UTRA physical layer aspects (Release 9), 3GPP TR 36.814 V9.0.0 (Mar. 2010).
"3rd Generation Partnership Project; Technical Specification Group Radio Access Network; Evolved Universal Terrestrial Radio Access (E-UTRA); Physical layer; Measurements (Release 9 )", 3GPP Standard; 3GPP TS 36.214, 3rd Generation Partnership Project (3GPP), Mobile Competence Centre ; 650, Route Des Lucioles ; F-06921 Sophia-Antipolis Cedex ; France, No. V9.2.0, Jun. 14, 2010 (Jun. 14, 2010), pp. 1-14, XP050441717, [retrieved on Jun. 14, 2010].
CATT: "Aspects of Joint Processing for Downlink CoMP", 3GPP Draft; R1-090942, 3rd Generation Partnership Project (3GPP), Mobile Competence Centre ; 650, Route Des Lucioles ; F-06921 Sophia-Antipolis Cedex ; France, no. Athens, Greece; Feb. 4, 2009, Feb. 4, 2009 (Feb. 4, 2009), XP050318782.
CATT, "Aspects of Joint Processing in Downlink CoMP", 3GPP Draft, R1-090193, 3rd Generation Partnership Project (3GPP), Mobile Competence Centre , 650, Route Des Lucioles , F-06921 Sophia-Antipolis Cedex , France, no. Ljubljana, Jan. 8, 2009, Jan. 8, 2009 (Jan. 8, 2009), XP050318126.
Chttl et al., "A Hybrid Concept of ICIC and CoMP for LTE-A: Initial Evaluation", 3GPP Draft; R1-090956, 3rd Generation Partnership Project (3GPP), Mobile Competence Centre; 650, Route Des Lucioles; F-06921 Sophia-Antipolis Cedex; France, no. Athens, Greece; pp. 1-5, Feb. 9-13, XP050318794, [retrieved on Feb. 4, 2009].
Hitachi LTD: "Consideration on Feedback for Adaptive Cell Clustering", 3GPP Draft; R1-100172 Consideration on Feedback for Adaptive Cell Clustering, 3rd Generation Partnership Project (3GPP), Mobile Competence Centre ; 650, Route Des Lucioles ; F-06921 Sophia-Antipolis Cedex ; France, vol. RAN WGI, no. Valencia, Spain; Jan. 18, 2010, Jan. 22, 2010 (Jan. 22, 2010), XP050418414, [retrieved on Jan. 22, 2010] the whole document.
Karakayali M.K., et al., "Network Coordination for spectrally efficient Communications in Cellular Systems", Aug. 2006, IEEE Wireless Communications Magazine pp. 56-61.
LG Electronics: "Cell Clustering and Feedback for CoMP", 3GPP Draft; RI-091189, 3rd Generation Partnership Project (3GPP), Mobile Competence Centre ; 650, Route Des Lucioles ; F-06921 Sophia-Antipolis Cedex ; France, no. Seoul, Korea; Mar. 17, 2009, Mar. 17, 2009 (Mar. 17, 2009), XP050338806, [retrieved on Mar. 17, 2009].
LTE; Evolved Universal Terrestrial Radio Access (E-UTRA) and Evolved Universal Terrestrial Radio Access Network (E-UTRAN); Overall description; Stage 2 (3GPP TS 36.300 version 9.2.0 Release 9), Technical Specification, European Telecommunications Standards Institute (ETSI), 650, Route Des Lucioles ; F-06921 Sophia-Antipolis ; France, vol. 3GPP RAN 2, no. V9.2.0, Feb. 1, 2010 (Feb. 1, 2010), XP014046900, p. 56-58.
Motorola, "Coordinated Multi-Point Transmission—Coordinated Beamforming/Precoding and Some Performance Results", 3GPP Draft, R1-090325 Comp Results (Motorola), 3rd Generation Partnership Project (3GPP), Mobile Competence Centre , 650, Route Des Lucioles , F-06921 Sophia-Antipolis Cedex , France, no. Ljubljana, Jan. 8, 2009, Jan. 8, 2009 (Jan. 8, 2009), XP050318236.
Nortel: "Updates on Cell Clustering for CoMP Transmission/Reception", 3GPP Draft; R1-091919(Nortel-Clustering for Comp), 3rd Generation Partnership Project (3GPP), Mobile Competence Centre; 650, Route Des Lucioles; F-06921 Sophia-Antipolis Cedex; France, no. San Francisco, USA; Apr. 28, 2009, Apr. 28, 2009 (Apr. 28, 2009), XP050339406, [retrieved on Apr. 28, 2009].
Papadogiannis, A., et al., "A Dynamic Clustering Approach in Wireless Networks with Multi-Cell Cooperative Processing." IEEE Communications, 2008. Piscataway, NJ, USA, May 19, 2008, pp. 4033-4037.
Papadogiannis A., et al., "The Value of Dynamic Clustering of Base Stations for Future Wireless Networks", IEEE International Conference on Fuzzy Systems (FUZZ-IEEE 2010), Barcelona, Spain, Jul. 2010 pp. 1-6.
Sivarama Venkatesan ED—Anonymous: "Coordinating Base Stations for Greater Uplink Spectral Efficiency in a Cellular Network", IEEE International Symposium on Personal, Indoor and Mobile Radio Communications. PIMRC, IEEE; PI, XX, Sep. 1, 2007 (Sep. 1, 2007), pp. 1-5, XP031168849 ISBN: 978-1-4244-1143-6 p. 1, left-hand column, line 20—right-hand column, line 37 p. 2, right-hand column, line 42—p. 5, left-hand column, line 6.
Ulrich Barth, "Self-X RAN Autonomous Self Organizing Radio Access Networks", 2009 7th International Symposium on Modeling and Optimization in Mobile, AD HOC, and Wireless Networks : (WI0PT 2009) ; Seoul, Korea, Jun. 23-27, 2009, IEEE, Piscataway, NJ, USA, [Online] Jun. 23, 2009 (Jun. 23, 2009), pp. 1-36, XP002603562, ISBN: 978-1-4244-4919-4 Retrieved from the Internet: URL:http://www.wi opt.org/pdf/Wi 0pt09_Keyno te_Speech3.pdf> [retrieved on Oct. 5, 2010] pp. 8, 10-11,14-17.
Weber R., et al., "Self-Organizing Adaptive Clustering for Cooperative Multipoint Transmission", Qualcomm CDMA Technologies, submitted to the IEEE Vehicular Technology Conference 2011.
Taiwan Search Report—TW098127446—TIPO—dated Dec. 10, 2012.
Alcatel-Lucent, "Uplink Coordinated Multi-Point Reception with Distributed Inter-Cell Interference Suppression for LTE-A", 3GPP TSG RAN WG1 Meeting #58, R1-093366, Shenzhen, China, Aug. 24-28, 2009, 4 pages.

* cited by examiner

HIERARCHICAL CLUSTERING FRAMEWORK FOR INTER-CELL MIMO SYSTEMS

CLAIM OF PRIORITY UNDER 35 U.S.C. § 119

This application claims the benefit of U.S. Provisional Patent Application No. 61/089,435, entitled HIERARCHICAL CLUSTERING FRAMEWORK FOR INTER-CELL MIMO SYSTEMS, and filed on Aug. 15, 2008, the entirety of which is incorporated herein by reference.

BACKGROUND

I. Field

The following description relates generally to wireless communications systems, and more particularly to hierarchical clustering techniques to optimize performance in wireless networks.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems including E-UTRA, and orthogonal frequency division multiple access (OFDMA) systems.

An orthogonal frequency division multiplex (OFDM) communication system effectively partitions the overall system bandwidth into multiple ($N_F$) subcarriers, which may also be referred to as frequency sub-channels, tones, or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval that may be dependent on the bandwidth of each frequency subcarrier, a modulation symbol may be transmitted on each of the $N_F$ frequency subcarrier. Thus, OFDM may be used to combat inter-symbol interference (ISI) caused by frequency selective fading, which is characterized by different amounts of attenuation across the system bandwidth.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Multi Input Multi Output (MIMO) techniques, i.e., transmission schemes with multiple transmit and receive antennas greatly improve user performance in cellular systems. Traditionally, MIMO techniques have been restricted to employing antennas on the same cell-site. Recently there has been interest in systems where the antennas from different cell-sites are pooled together to create an inter-cell MIMO system. This leads to the problem of determining which cells in a network should be chosen as the cooperation set for a given user.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods provide multi-level clustering of wireless components in order to facilitate higher performance service to user equipment. In one aspect, a hierarchical arrangement of base stations (or base station equipment such as antennas) is provided where cooperation is maintained at a top level of the hierarchy by stations or components referred to as a master cluster. The master cluster is employed to process higher level system functionality such as scheduling with a subset of selected user equipment. Subservient to the master cluster is one or more nested clusters that operate more direct or high performance aspects such as high speed bidirectional data transfer between user equipment and the nested cluster. By bifurcating functionality in this manner between upper level functions such as scheduling and dedicated functions such as data transfer, system performance is improved.

The master clusters are typically statically arranged to provide scheduling or other services to a subset of user equipment. Nested cluster arrangements can change dynamically over time as network system conditions change (e.g., such as detected by network parameters). Also, nested clusters can transfer substantially any type of data not normally charged to the master cluster, where such data can include messages or other network handshaking not normally processed by the master cluster. In addition to a master/nested cluster arrangement, other hierarchical arrangements are possible. For example, multi-level nesting of layers can be provided where a nested cluster acts as a master cluster for another nested cluster and so forth.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate user equipment performance in a wireless communications system. In one aspect, a method for wireless communications is provided. The method includes forming a first set of wireless components into a master cluster that provides upper level service functionality to a subset of user devices. The method includes forming a second set of wireless components into a nested cluster that is associated with the master cluster, where the nested cluster provides data transfer to and from the subset of user devices. This can include forming at least one other set of wireless components into a cluster that is controlled by at least one other nested cluster (e.g., nested cluster within another nested cluster). The upper level service functionality can be associated with a scheduling function. The first set of wireless components forming the master cluster or the second set of wireless components forming the nested cluster can selected from a set of base stations or from a subset of antennas associated with the base stations.

It is noted that in one or more exemplary embodiments described herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 1:
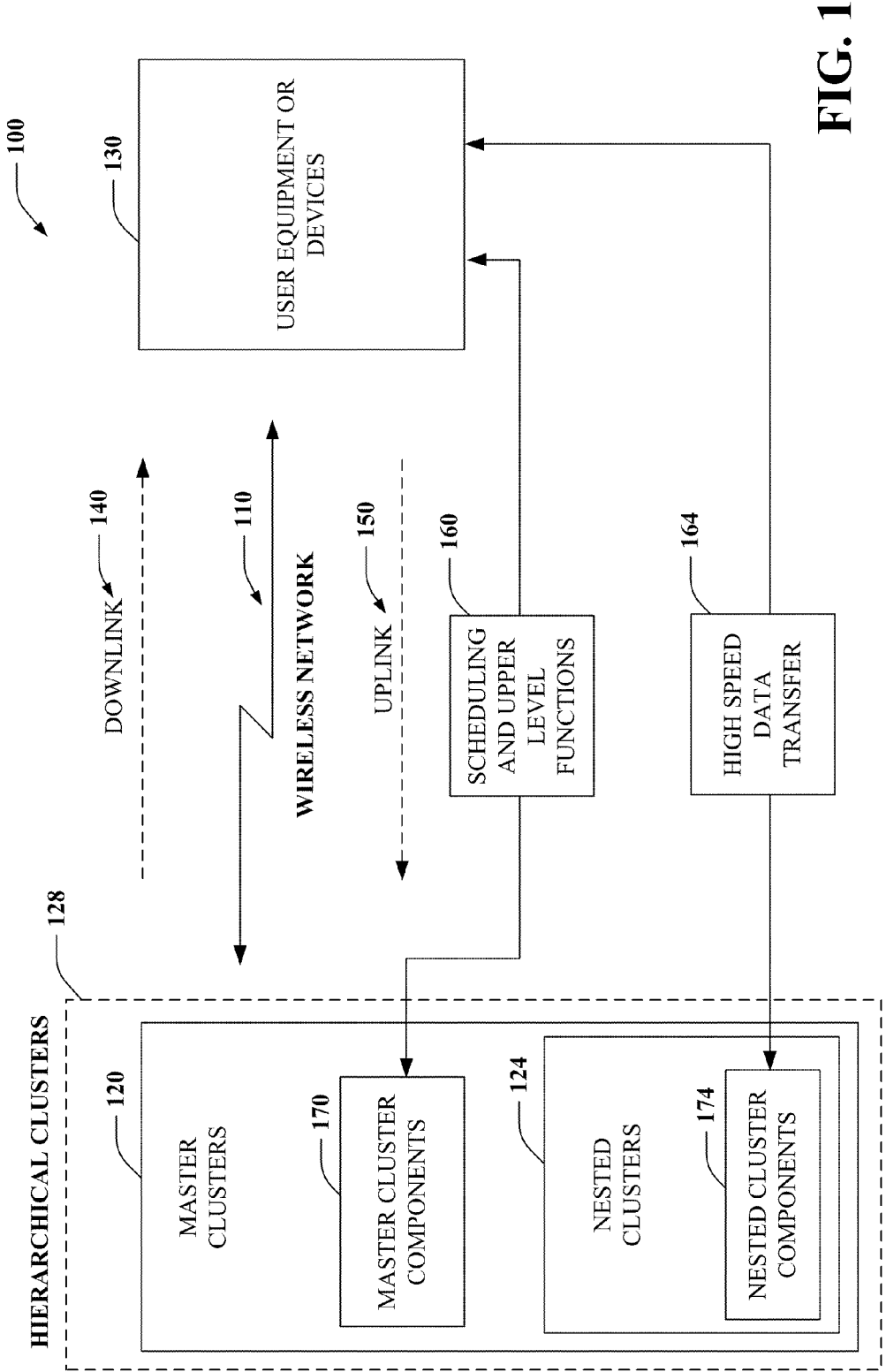
FIG. 1 is a high level block diagram of a system that provides hierarchical cluster operations for a wireless communications system.

Referring now to FIG. 1, a system 100 provides hierarchical cluster operations for a wireless communications system. The system 100 includes one or more base station clusters 120, 124 (also referred to as a node, evolved node B-eNB, femto station, pico station, and so forth) which can be an entity capable of communication over a wireless network 110 to a second device 130 (or devices). Each cluster 120 referred to as a master cluster and 124 referred to as a nested cluster includes two or more base stations acting in a cooperative manner, where the collection or aggregation of all base stations are referred to as hierarchical clusters 128. It is noted that as used herein, the term cluster refers to a set of wireless components that cooperate to provide wireless service. This can include a cooperation of base stations and/or antennas. Such antennas may be clustered from a single base station or may be clustered from/across multiple stations.

Each device 130 (or subset of devices) can be an access terminal (also referred to as terminal, user equipment, station or mobile device). The base station clusters 120 or 124 communicate to the device 130 via downlink 140 and receive data via uplink 150. Such designation as uplink and downlink is arbitrary as the device 130 can also transmit data via downlink and receive data via uplink channels. It is noted that although three components 120, 124, and 130 are shown, that more than three components can be employed on the network 110, where such additional components can also be adapted for the wireless processing and cluster operations described herein.

The hierarchical clusters 128 control at least two tiers of communications shown as a scheduling or upper level function 160 and high speed data transfer 164. In general, the master cluster 120 is responsible for the scheduling function 160 and employs one or more master cluster components 170 to perform the scheduling. Free from scheduling and other concerns, the nested clusters 124 can perform the high speed data transfers 164 via one or more nested cluster components 174. By sharing responsibilities in this manner between master and nested clusters, network performance can be improved.

The hierarchical clusters 128 provide multi-level clustering of wireless components in order to facilitate higher performance service to the user equipment 130. In one aspect, a hierarchical arrangement of base stations (or base station equipment such as antennas) is provided where cooperation is maintained at a top level of the hierarchy by stations or components referred to as the master cluster 120. The master cluster 120 is employed to process higher level system functionality such as scheduling at 160 with a subset of selected user equipment 130. Subservient to the master cluster 120 is one or more nested clusters 124 that operate more direct or high performance aspects such as high speed bidirectional data transfer 164 between user equipment 130 and the nested cluster. By bifurcating functionality in this manner between upper level functions such as scheduling at 160 and dedicated functions such as data transfer at 164, system performance is improved.

The master clusters 120 are typically statically arranged to provide scheduling or other services to a subset of user equipment. Nested cluster arrangements can change dynamically over time as network system conditions change (e.g., such as detected by network parameters). Also, nested clusters 124 can transfer substantially any type of data not normally charged to the master cluster 120, where such data can include messages or other network handshaking not normally processed by the master cluster. In addition to a master/nested cluster arrangement, other hierarchical arrangements are possible. For example, multi-level nesting of layers can be provided where a nested cluster acts as a master cluster for another nested cluster and so forth. Network parameters for determining clusters can relate to a plurality of factors such as resource allocation needs, interference conditions, signal strength, signal quality, quality of service, and signal-to-noise ratio (SNR), for example. In general, the parameters are analyzed, various clusters are dynamically formed in view of the automated analysis via the cluster components 170 and 174, and different clusters are selected to provide the most optimum service to the device 130 (or device subsets).

In general, Multi Input Multi Output (MIMO) techniques, e.g., transmission schemes with multiple transmit and receive antennas greatly improve user performance in cellular systems. Traditionally, MIMO techniques have been restricted to using antennas on the same cell-site. Recently there has been a renewed interest in systems where the antennas from different cell-sites are pooled together to create an inter-cell MIMO system.

In one aspect, a systematic approach is provided to aggregating cells (including from different cell-sites) to create clusters. A cluster is a set of cells that cooperate to implement inter-cell MIMO in one example. A two-level clustering scheme using master clusters 120 and nested clusters 124 within the master cluster can be provided but as previously noted, multilevel clustering is possible (e.g., nested clusters within other nested clusters).

Typically, all the cells in the network 110 are portioned into master clusters 120. The master cluster 120 is thus a collection of disjoint cells in the network 110. Each master cluster 120 has its own scheduler and thus cells belonging to different master clusters generally do not cooperate. The nested cluster 124 is a subset of cells belonging to the master cluster 120, where a cell can be a member of more than one nested cluster. When user equipment 130 is scheduled by the master cluster 120, it assigns to the user a nested cluster 124 that will serve the user for the duration of that scheduling decision. Thus to implement a MIMO transmission for user k, all cells in the nested cluster assigned to user k share data packets and channel state information (CSI) of user k. This sharing of data and CSI, performed on the backhaul link connecting different cell sites, imposes constraints on the latency and capacity of the backhaul link. It is desirable to note that in this framework the master clusters 120 are typically static, i.e., once defined they do not typically change. Whereas, the set of nested clusters 124 that are active is dynamic, i.e., they can depend on the scheduler decision and change over time and frequency or detected network parameters.

Typically, nested clusters 124 consist of one to three cells, as increasing the size of a nested cluster may make it difficult to enforce the backhaul latency constraints across all cells in that nested cluster. Furthermore, most users should see sufficient improvement in performance when served by nested clusters of size three. A master cluster 120 typically would consist of larger number of cells, since a larger master cluster increases the probability that the dominant interferers of a user lie within the master cluster and thus can be involved in the MIMO transmission. A larger master cluster 120 also provides the scheduler a greater flexibility to select which users to schedule on a resource. This flexibility is useful in lightly loaded systems because for a MIMO transmission, users are grouped so that all degrees of freedom in the system are fully utilized. In the following discussions in FIGS. 2-4, various hierarchical clustering framework examples are provided. It is to be appreciated however that the hierarchical cluster concepts described herein are not limited to such examples.

Scheduling decisions can also be divided into multiple components, where some are performed by the master cluster and some are carried out by the nested cluster. In one form, the master cluster can make coarse scheduling decisions by assigning user equipment to different nested clusters. Finer scheduling decisions such as beam directions, packet formats for particular UEs can be made within each nested cluster.

Before proceeding, it is noted that the system 100 can be employed with an access terminal or mobile device, and can be, for instance, a module such as an SD card, a network card, a wireless network card, a computer (including laptops, desktops, personal digital assistants (PDAs)), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g. communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
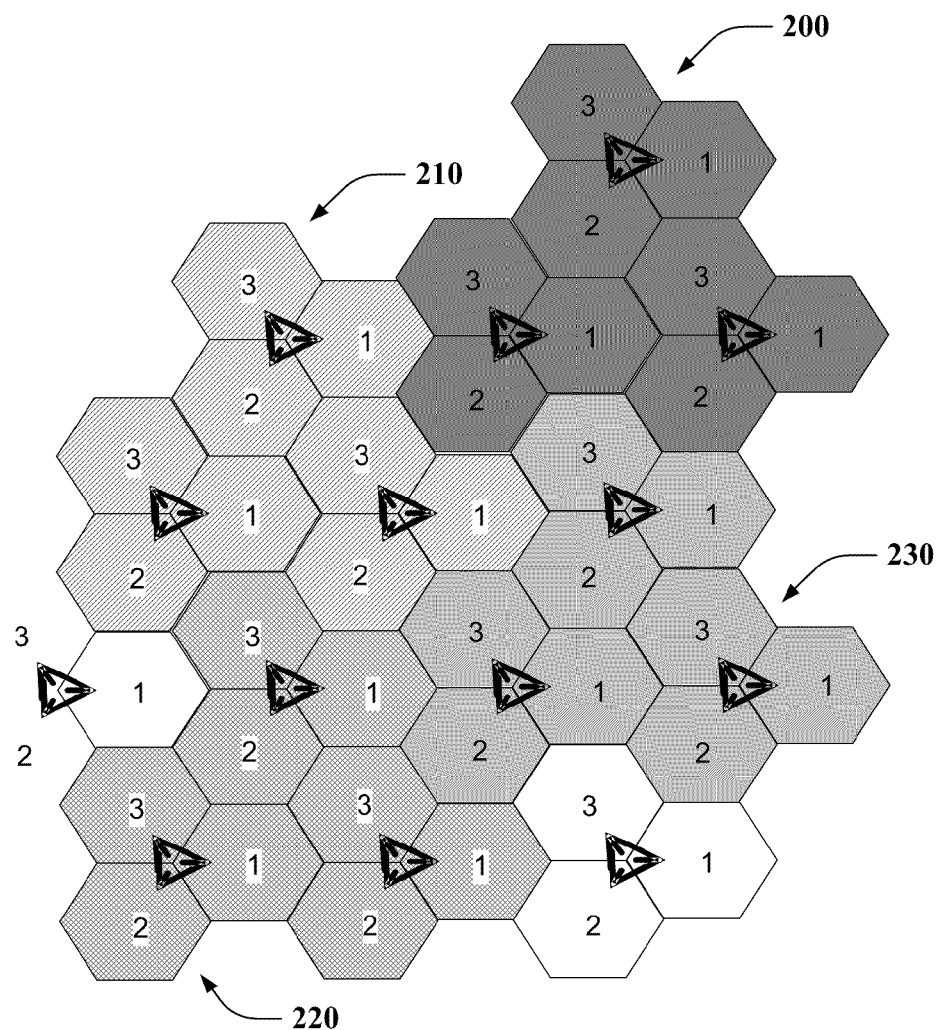
FIGS. 2-4 are network diagrams that illustrate example master and nested clusters for a wireless system.

Referring now to FIG. 2, a master cluster example is illustrated for a wireless system. In this example, four master clusters 200-230 are shown, where each cluster is differentiated visually by various shadings and cross hatch. In this example, the master clusters 210-230 consist of 4 cell sites having 9 cells per site. It is to be appreciated that other arrangements are possible having differing numbers of cell sites, cells per site, and/or master clusters.

Figure 3:
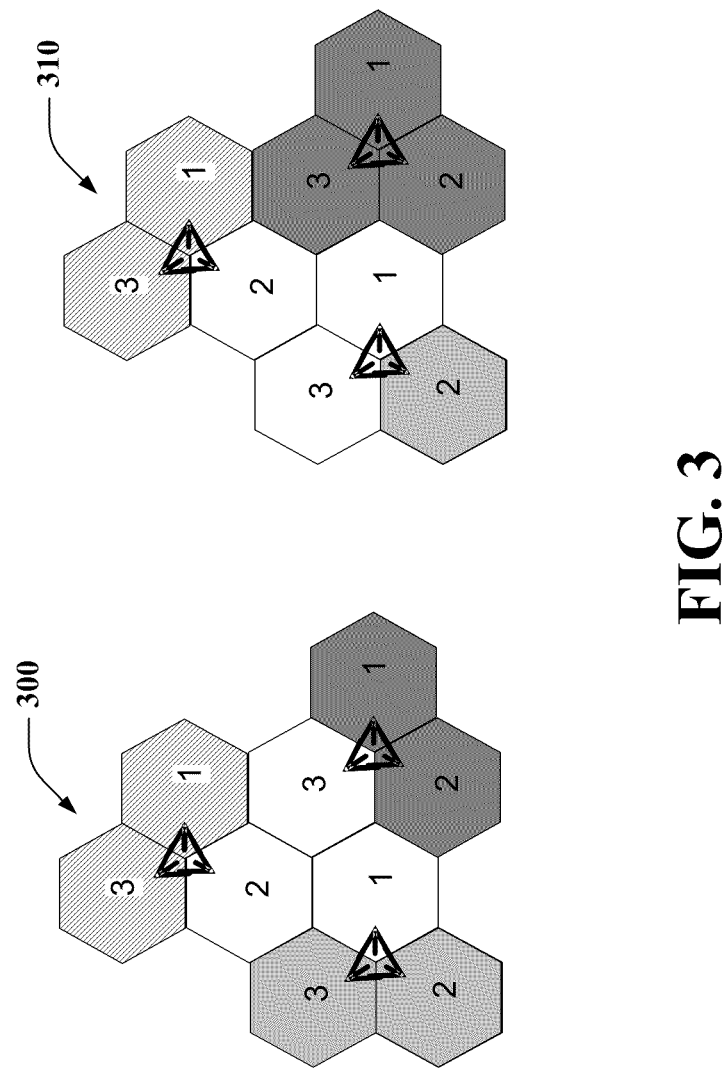

Turning to FIG. 3, a nested cluster example is illustrated. In this example, two nested clusters 300 and 310 are shown where various shadings and cross hatch visually illustrate example cooperation among cells in the nested clusters. As shown, two possible arrangements 300 and 310 define four nested clusters within a given master cluster. Each shade of grey or cross hatch represents one nested cluster. Depending on which users are to be scheduled, one of the two configurations 300 or 310 can be selected by the scheduler of the master cluster. It is to be appreciated that other nested configurations are possible.

Figure 4:
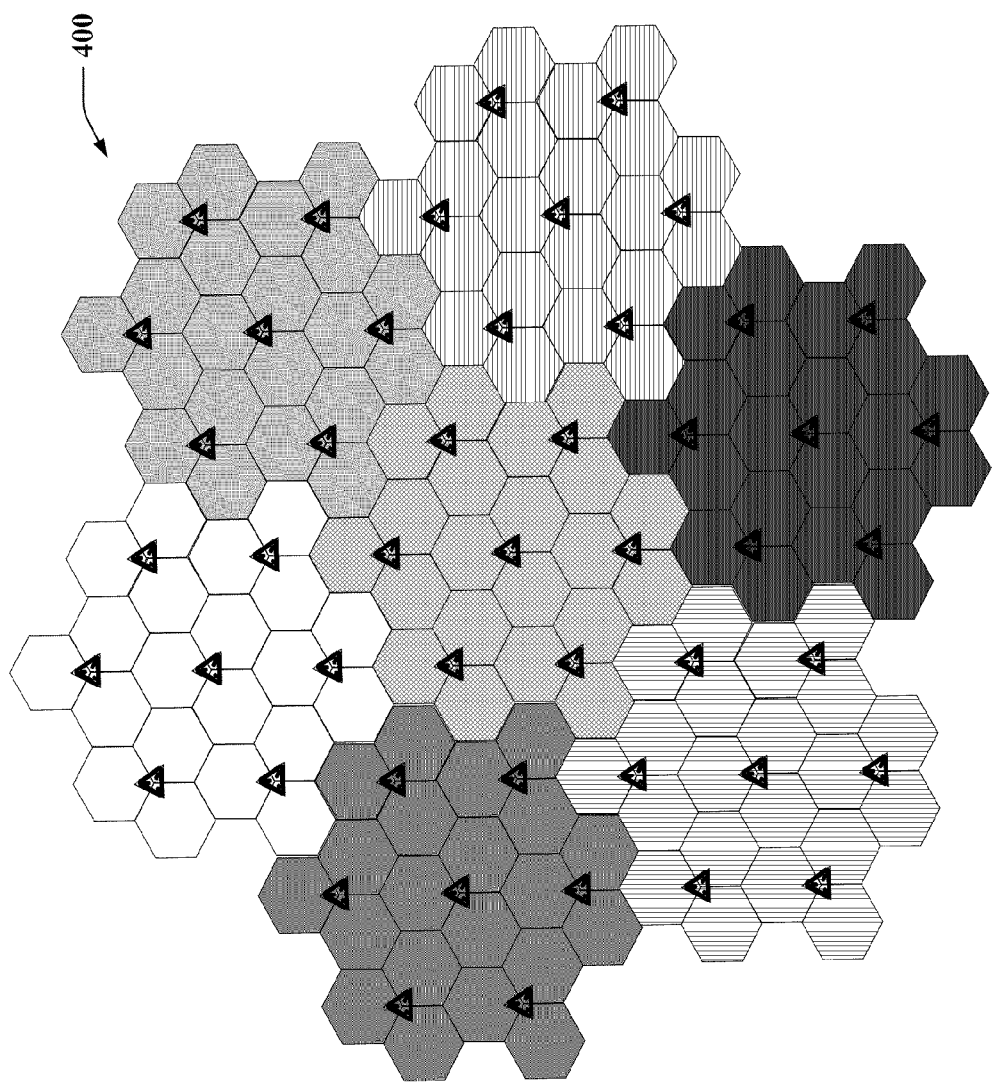

Referring to FIG. 4, an alternative example arrangement of master clusters is illustrated. In the previous example, the master cluster consisted of 9 cells. This example arrangement at 400 demonstrates a partitioning scheme where master clusters consist of 7 cell-sites where each site has 21 sectors. As mentioned previously, one of advantages of selecting larger master clusters is that it minimizes the number of users at the cluster boundary, i.e. users are more likely to have their dominant interferes within the master cluster. The increased size of the master clusters however can result in a more complex scheduler. As noted previously, other master and/or nested configurations are possible.

Figure 5:
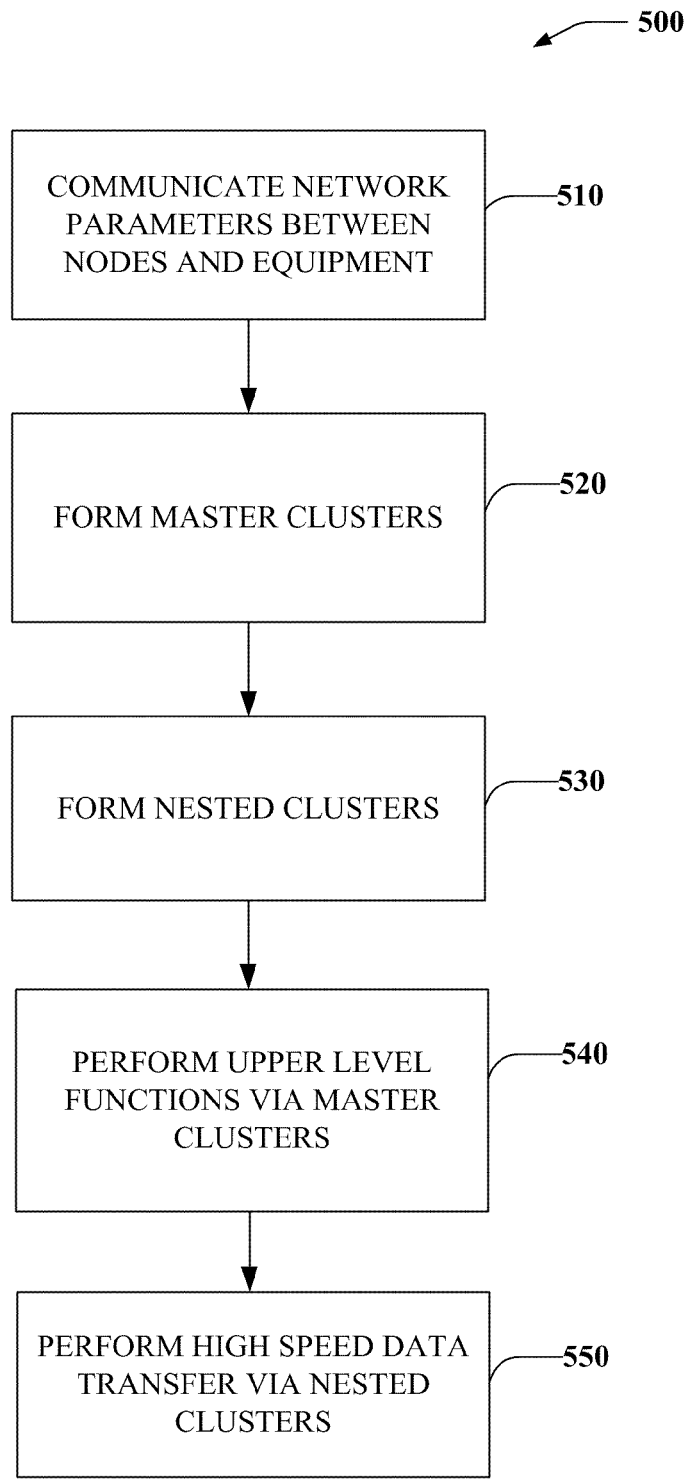
FIG. 5 is a flow diagram of a hierarchical cluster process for a wireless communications system.

Referring now to FIG. 5, a wireless communication methodology 500 for cluster and wireless optimization is illustrated. While, for purposes of simplicity of explanation, the methodology (and other methodologies described herein) are shown and described as a series of acts, it is to be understood and appreciated that the methodology is not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter. In general, the process 300 can be implemented as processor instructions, logical programming functions, or other electronic sequence that supports automatic handover control and parameter optimizations described herein.

Proceeding to 510 of FIG. 5, network parameters are communicated between base station nodes, wireless components such as antennas, and user equipment. Such parameters can be related to recourses, signal conditions, service requirements, and other factors as previously described. At 520, one or more master clusters are formed. As noted previously, these can include various cell sites that are composed of various cells. The master clusters are typically statically arranged but dynamic arrangements are also possible. At 530, one or more nested clusters are formed, wherein each of the nested clusters are associated or controlled by one or more of the master clusters formed at 520. As noted previously, the nested clusters may be dynamically created and adjusted based upon detected network conditions such as derived from network parameters or user equipment feedback, for example. At 540, upper level functions are performed by the master clusters. The upper level functions typically include scheduling or other housekeeping not performed by the nested clusters. At 550, the nested clusters perform high speed data transfer between the nested clusters and a subset of user equipment. Since the nested clusters are free from scheduling and other overhead, they can perform data transfer with the user equipment in a more efficient manner.

The techniques processes described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors.

Figure 6:
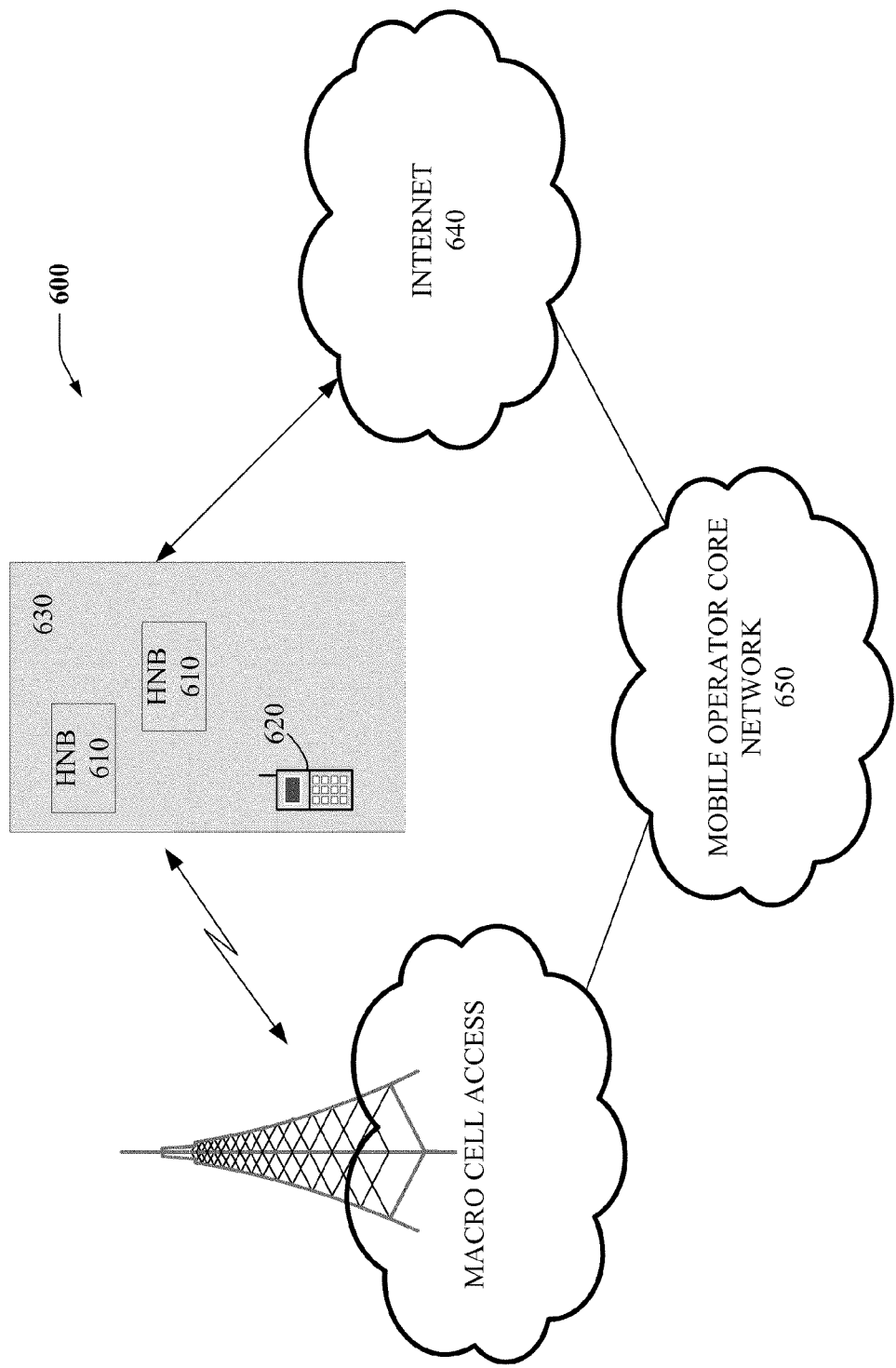
FIG. 6 illustrates an example wireless system.

FIG. 6 illustrates an exemplary communication system to enable deployment of access point base stations within a network environment. As shown in FIG. 6, a system 600 includes multiple access point base stations or, in the alternative, femto cells, or Home Node B units (HNBs), such as, for example, HNBs 610, each being installed in a corresponding small scale network environment, such as, for example, in one or more user residences 630, and being configured to serve associated, as well as alien, user equipment (UE) 620. Each HNB 610 is further coupled to the Internet 640 and a mobile operator core network 650 via a DSL router (not shown) or, alternatively, a cable modem (not shown).

Figure 7:
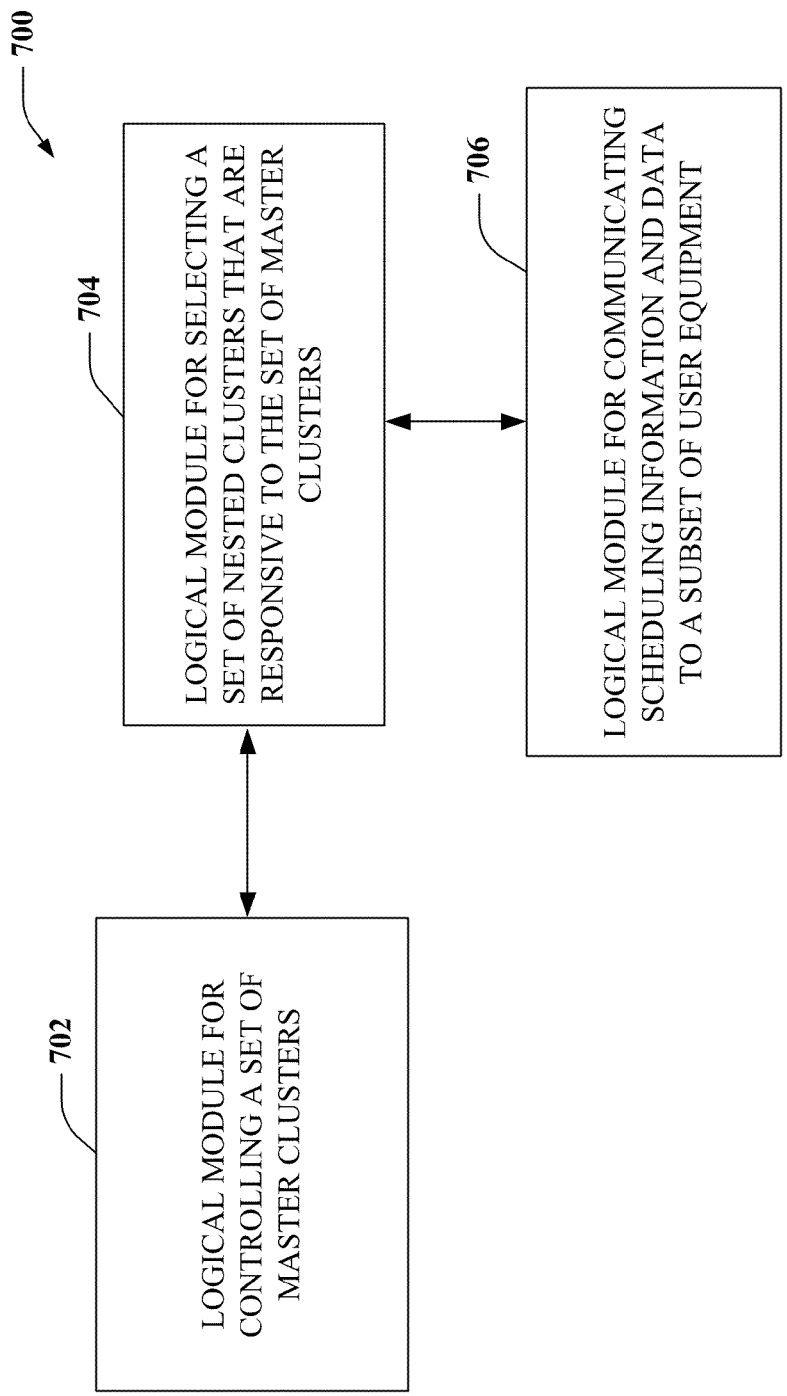
FIG. 7 illustrates an example logical module for alternative cluster processing.

Turning now to FIG. 7, a system is provided that relates to wireless signal processing. The systems are represented as a series of interrelated functional blocks, which can represent functions implemented by a processor, software, hardware, firmware, or any suitable combination thereof.

Referring to FIG. 7, a wireless communication system 700 is provided. The system 700 includes a logical module 702 or means for controlling a set of master clusters. This includes a logical module 704 or means for selecting a set of nested clusters that are responsive to the set of master clusters. This also includes a logical module 706 or means for communicating scheduling information and data to a subset of user equipment. The system 700 can include at least one nested cluster that is controlled by at least one other nested cluster.

In another aspect, a method for wireless communications is provided. The method includes forming a first set of wireless components into a master cluster that provides upper level service functionality to a subset of user devices; and forming a second set of wireless components into a nested cluster that is associated with the master cluster, where the nested cluster provides data transfer to and from the subset of user devices. The method includes forming at least one other set of wireless components into a cluster that is controlled by at least one other nested cluster. The upper level service functionality is associated with a scheduling function. This includes the first set of wireless components forming the master cluster or the second set of wireless components forming the nested cluster are selected from a set of base stations or from a subset of antennas associated with the base stations.

The method includes processing network parameters that include time parameters, frequency parameters, resource allocation parameters, interference condition parameters, signal strength parameters, signal quality parameters, quality of service parameters, or signal-to-noise ratio (SNR) parameters, the network parameters employed to determine the nested clusters. This includes statically configuring the network clusters and dynamically configuring the nested clusters. The method includes forming the master clusters as a set of cell sites that are associated with a set of cells per cell. In one aspect, the number of cell sites is three and the numbers of cells per site is nine. In another aspect, the number of cell sites is seven and the number of cells per site is twenty one. The method includes assigning a nested cluster that serves the subset of user devices for the duration of a scheduling decision, where the subset of user devices shares data packets and channel state information. The data packets and channel state information are shared over a back haul link connecting different cell sites.

In another aspect, a communications apparatus is provided. The apparatus includes a memory that retains instructions for forming a master cluster that provides scheduling functionality to a subset of user devices, and a nested cluster that is associated with the master cluster, where the nested cluster provides data transfer to and from the subset of user devices; and a processor that executes the instructions. This includes instructions for forming at least one other cluster that is controlled by at least one other nested cluster. The master cluster or the nested cluster are selected from a set of base stations or from a subset of antennas associated with the base stations. The apparatus includes network parameters that include time parameters, frequency parameters, resource allocation parameters, interference condition parameters, signal strength parameters, signal quality parameters, quality of service parameters, or signal-to-noise ratio (SNR) parameters, the network parameters employed to determine the nested clusters. This includes statically configuring the master clusters or dynamically configuring the nested clusters. The apparatus includes assigning a nested cluster that serves the subset of user devices for the duration of a scheduling decision, where the subset of user equipment shares data packets and channel state information. The data packets and channel state information are shared over a back haul link connecting different cell sites.

In another aspect, a computer program product is provided. This includes a computer-readable medium that includes code for managing handovers, the code comprising: code for causing a computer to select a set of master clusters; code for causing a computer to process a set of nested clusters that are controlled by the set of master clusters; and code for causing a computer to schedule information via a first communication channel and provide data transfer via a second data channel to a subset of user equipment. This includes code for causing a computer to process a set of network parameters to dynamically determine the nested clusters. In another aspect, this includes dynamically configuring nested clusters based on user equipment to be scheduled or based on past configurations of the nested clusters. This includes forming the master clusters as a set of cell sites that are associated with a set of cells per site, where the number of cell sites is three and the numbers of cells per site is nine. In another aspect, the number of cell sites is seven and the number of cells per site is twenty one. This includes assigning a nested cluster that serves the subset of user devices for the duration of a scheduling decision. This also includes cell sites that share data packets and channel state information. The data packets and channel state information are shared over a back haul link connecting different cell sites within one or more master clusters. This includes a master cluster that restricts user equipment feedback to a subset of nested clusters.

Figure 8:
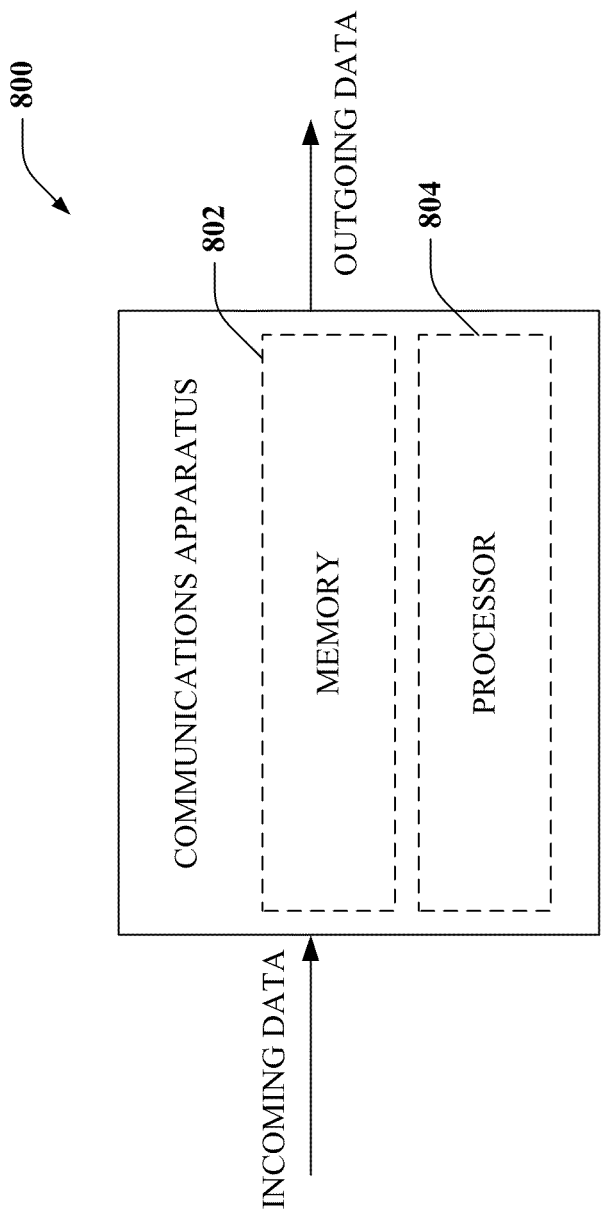
FIG. 8 illustrates an example communications apparatus that employ automatic cluster processes.

FIG. 8 illustrates a communications apparatus 800 that can be a wireless communications apparatus, for instance, such as a wireless terminal. Additionally or alternatively, communications apparatus 800 can be resident within a wired network. Communications apparatus 800 can include memory 802 that can retain instructions for performing a signal analysis in a wireless communications terminal. Additionally, communications apparatus 800 may include a processor 804 that can execute instructions within memory 802 and/or instructions received from another network device, wherein the instructions can relate to configuring or operating the communications apparatus 800 or a related communications apparatus.

Figure 9:
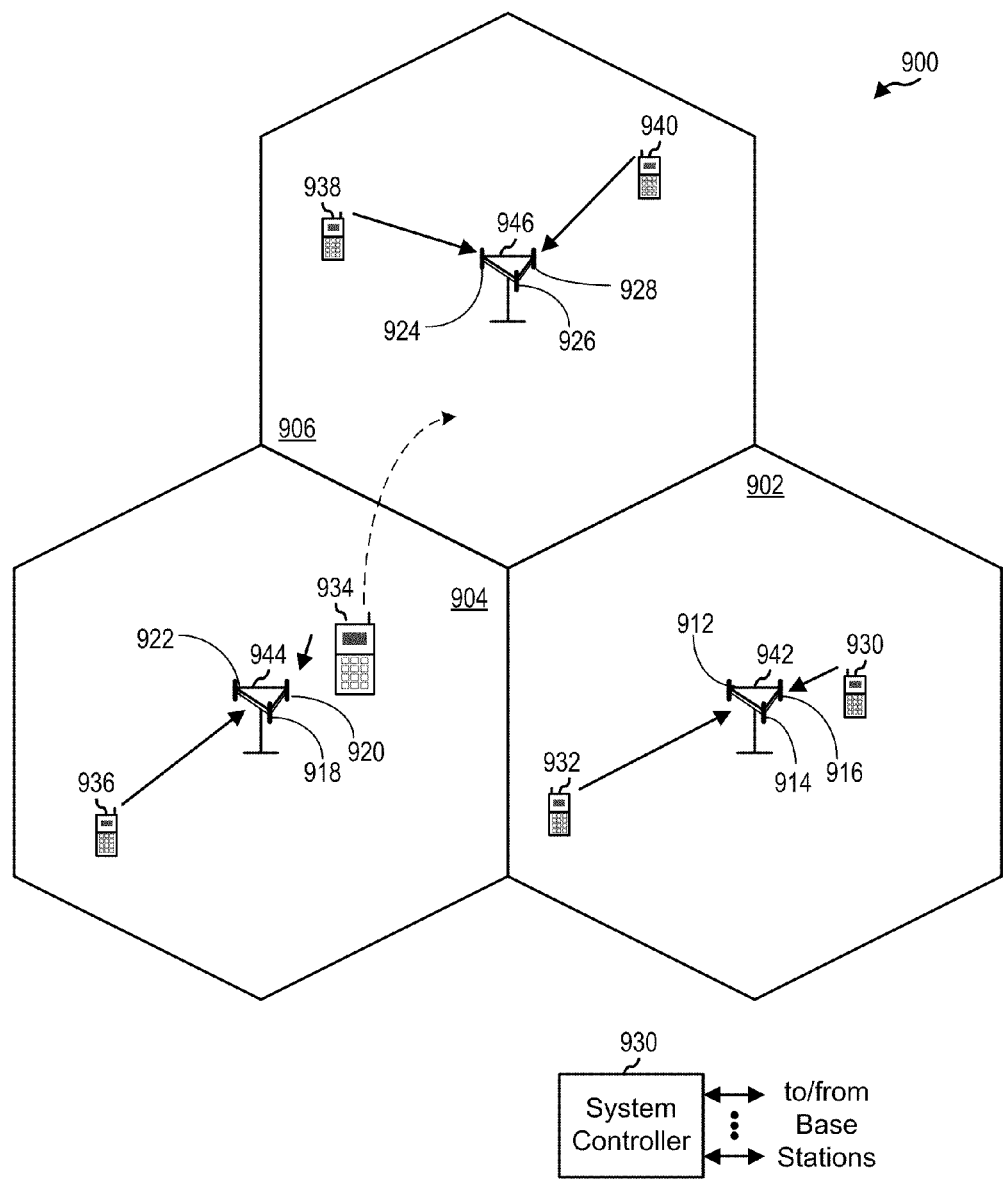
FIG. 9 illustrates a multiple access wireless communication system.

Referring to FIG. 9, a multiple access wireless communication system 900 is illustrated. The multiple access wireless communication system 900 includes multiple cells, including cells 902, 904, and 906. In the aspect the system 900, the cells 902, 904, and 906 may include a Node B that includes multiple sectors. The multiple sectors can be formed by groups of antennas with each antenna responsible for communication with UEs in a portion of the cell. For example, in cell 902, antenna groups 912, 914, and 916 may each correspond to a different sector. In cell 904, antenna groups 918, 920, and 922 each correspond to a different sector. In cell 906, antenna groups 924, 926, and 928 each correspond to a different sector. The cells 902, 904 and 906 can include several wireless communication devices, e.g., User Equipment or UEs, which can be in communication with one or more sectors of each cell 902, 904 or 906. For example, UEs 930 and 932 can be in communication with Node B 942, UEs 934 and 936 can be in communication with Node B 944, and UEs 938 and 940 can be in communication with Node B 946.

Figure 10:
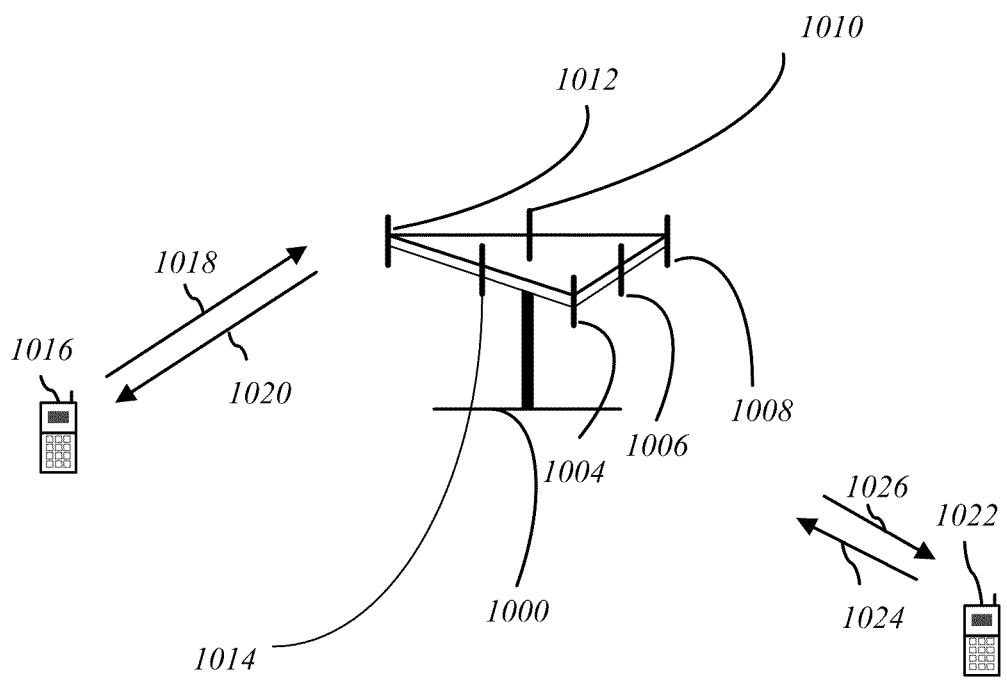
FIGS. 10 and 11 illustrate example communications systems.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 11:
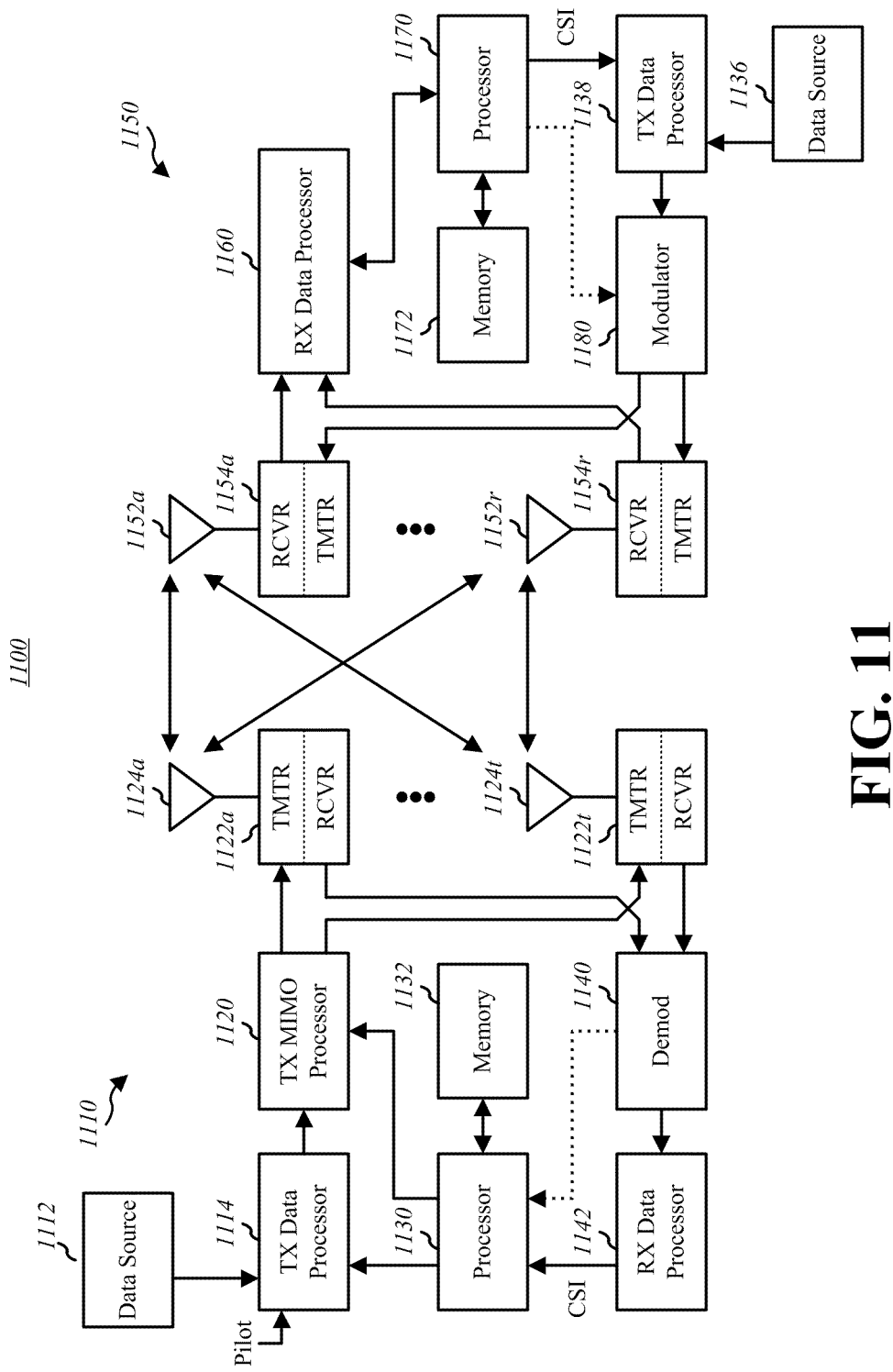

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which precoding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises: Common Pilot Channel (CPICH), Synchronization Channel (SCH), Common Control Channel (CCCH), Shared DL Control Channel (SD-CCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH), for example.

The UL PHY Channels comprises: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH), for example.

Other terms/components include: 3G 3rd Generation, 3GPP 3rd Generation Partnership Project, ACLR Adjacent channel leakage ratio, ACPR Adjacent channel power ratio, ACS Adjacent channel selectivity, ADS Advanced Design System, AMC Adaptive modulation and coding, A-MPR Additional maximum power reduction, ARQ Automatic repeat request, BCCH Broadcast control channel, BTS Base transceiver station, CDD Cyclic delay diversity, CCDF Complementary cumulative distribution function, CDMA Code division multiple access, CFI Control format indicator, Co-MIMO Cooperative MIMO, CP Cyclic prefix, CPICH Common pilot channel, CPRI Common public radio interface, CQI Channel quality indicator, CRC Cyclic redundancy check, DCI Downlink control indicator, DFT Discrete Fourier transform, DFT-SOFDM Discrete Fourier transform spread OFDM, DL Downlink (base station to subscriber transmission), DL-SCH Downlink shared channel, D-PHY 500 Mbps physical layer, DSP Digital signal processing, DT Development toolset, DVSA Digital vector signal analysis, EDA Electronic design automation, E-DCH Enhanced dedicated channel, E-UTRAN Evolved UMTS terrestrial radio access network, eMBMS Evolved multimedia broadcast multicast service, eNB Evolved Node B, EPC Evolved packet core, EPRE Energy per resource element, ETSI European Telecommunications Standards Institute, E-UTRA Evolved UTRA, E-UTRAN Evolved UTRAN, EVM Error vector magnitude, and FDD Frequency division duplex.

Still yet other terms include FFT Fast Fourier transform, FRC Fixed reference channel, FS1 Frame structure type 1, FS2 Frame structure type 2, GSM Global system for mobile communication, HARQ Hybrid automatic repeat request, HDL Hardware description language, HI HARQ indicator, HSDPA High speed downlink packet access, HSPA High speed packet access, HSUPA High speed uplink packet access, IFFT Inverse FFT, IOT Interoperability test, IP Internet protocol, LO Local oscillator, LTE Long term evolution, MAC Medium access control, MBMS Multimedia broadcast multicast service, MBSFN Multicast/broadcast over single-frequency network, MCH Multicast channel, MIMO Multiple input multiple output, MISO Multiple input single output, MME Mobility management entity, MOP Maximum output power, MPR Maximum power reduction, MU-MIMO Multiple user MIMO, NAS Non-access stratum, OBSAI Open base station architecture interface, OFDM Orthogonal frequency division multiplexing, OFDMA Orthogonal frequency division multiple access, PAPR Peak-to-average power ratio, PAR Peak-to-average ratio, PBCH Physical broadcast channel, P-CCPCH Primary common control physical channel, PCFICH Physical control format indicator channel, PCH Paging channel, PDCCH Physical downlink control channel, PDCP Packet data convergence protocol, PDSCH Physical downlink shared channel, PHICH Physical hybrid ARQ indicator channel, PHY Physical layer, PRACH Physical random access channel, PMCH Physical multicast channel, PMI Pre-coding matrix indicator, P-SCH Primary synchronization signal, PUCCH Physical uplink control channel, and PUSCH Physical uplink shared channel.

Other terms include QAM Quadrature amplitude modulation, QPSK Quadrature phase shift keying, RACH Random access channel, RAT Radio access technology, RB Resource block, RF Radio frequency, RFDE RF design environment, RLC Radio link control, RMC Reference measurement channel, RNC Radio network controller, RRC Radio resource control, RRM Radio resource management, RS Reference signal, RSCP Received signal code power, RSRP Reference signal received power, RSRQ Reference signal received quality, RSSI Received signal strength indicator, SAE System architecture evolution, SAP Service access point, SC-FDMA Single carrier frequency division multiple access, SFBC Space-frequency block coding, S-GW Serving gateway, SIMO Single input multiple output, SISO Single input single output, SNR Signal-to-noise ratio, SRS Sounding reference signal, S-SCH Secondary synchronization signal, SU-MIMO Single user MIMO, TDD Time division duplex, TDMA Time division multiple access, TR Technical report, TrCH Transport channel, TS Technical specification, TTA Telecommunications Technology Association, TTI Transmission time interval, UCI Uplink control indicator, UE User equipment, UL Uplink (subscriber to base station transmission), UL-SCH Uplink shared channel, UMB Ultra-mobile broadband, UMTS Universal mobile telecommunications system, UTRA Universal terrestrial radio access, UTRAN Universal terrestrial radio access network, VSA Vector signal analyzer, W-CDMA Wideband code division multiple access It is noted that various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

As used in this application, the terms "component," "module," "system," "protocol," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for wireless communications, comprising:
forming a first set of wireless components into a master cluster that provides upper level service functionality to subsets of user devices, including scheduling of data transfers for the subsets of user devices;
defining at least two configurations of two or more nested clusters that are associated with the master cluster, wherein each nested cluster is formed of subsets of the wireless components of the master cluster;
forming at least two nested clusters within another nested cluster of the two or more nested clusters, wherein the other nested cluster acts as another master cluster only for the at least two nested clusters formed therein;
choosing, by a scheduler of the master cluster, one of the at least two configurations depending on which users need to be scheduled, thereby assigning a nested cluster to serve a user for each scheduling decision; and
providing, only by nested clusters that do not act as the other master cluster, data transfer to and from their respective subset of user devices, wherein only the master cluster makes coarse scheduling decisions for the two or more nested clusters thereof by assigning the subsets of user devices to the two or more nested clusters thereof, only the other master cluster makes coarse scheduling decisions for the at least two nested clusters formed therein, and only nested clusters that do not-act as the master cluster or the other master cluster make fine scheduling decisions for user devices assigned thereto, including beam forming and packet formats for particular user devices, wherein the master cluster and the two or more nested clusters include two or more base stations or antennas associated with the two or more base stations, wherein the two or more nested clusters are always comprised of respective numbers of cells that are each smaller in number than a number of cells of which the master cluster is comprised.

2. The method of claim 1, further comprising:
processing network parameters, wherein the network parameters include at least one of time parameters, frequency parameters, resource allocation parameters, interference condition parameters, signal quality parameters, quality of service parameters, signal-to-noise ratio (SNR) parameters, or combinations thereof, and employing the network parameters to form the subsets of the wireless components into the two or more nested clusters.

3. The method of claim 2, wherein the network parameters include time parameters.

4. The method of claim 2, wherein the network parameters include frequency parameters.

5. The method of claim 2, wherein the network parameters include resource allocation parameters.

6. The method of claim 2, wherein the network parameters include quality of service parameters.

7. The method of claim 1, further comprising statically configuring the master cluster.

8. The method of claim 7, further comprising dynamically configuring the two or more nested clusters for the master cluster.

9. The method of claim 8, further comprising dynamically configuring the two or more nested clusters based on past configurations of the two or more nested clusters.

10. The method of claim 1, further comprising assigning a nested cluster that serves one of the subsets of user devices for a duration of a scheduling decision.

11. The method of claim 10, wherein cell sites share data packets or channel state information.

12. The method of claim 11, wherein the data packets and channel state information are shared over a back haul link connecting different cell sites within one or more master clusters.

13. The method of claim 1, wherein the master cluster restricts user equipment feedback to a subset of the nested clusters.

14. A communications apparatus, comprising:
a memory that retains instructions for:
forming cells of a wireless network into a master cluster, wherein the master cluster provides scheduling functionality to subsets of user devices,
defining at least two configurations of two or more nested clusters that are associated with the master cluster, wherein each nested cluster is formed of subsets of wireless components of the master cluster,
forming at least two nested clusters within another nested cluster of the two or more nested clusters,
wherein the other nested cluster acts as another master cluster only for the at least two nested clusters formed therein, and
choosing, by a scheduler of the master cluster, one of the at least two configurations depending on which users need to be scheduled, thereby assigning a nested cluster to serve a user for each scheduling decision,
wherein only the master cluster makes coarse scheduling decisions for the two or more nested clusters thereof by assigning the subsets of user devices to the two or more nested clusters thereof, only the other master cluster makes coarse scheduling decisions for the at least two nested clusters formed therein, and only nested clusters that do not act as the other master cluster make fine scheduling decisions for the subsets of user devices assigned thereto, including beam forming and packet formats for particular user devices,
wherein only nested clusters that do not act as the other master cluster provide data transfer to and from their respective subsets of user devices, and the master cluster and the two or more nested clusters include at least one of two or more base stations or antennas associated with the two or more base stations,
wherein the two or more nested clusters are always comprised of respective numbers of cells that are each smaller in number than a number of cells of which the master cluster is comprised; and
a processor that executes the instructions.

15. The apparatus of claim 14, wherein the memory further retains instructions for:
processing network parameters, wherein the network parameters include at least one of time parameters, frequency parameters, resource allocation parameters, interference condition parameters, signal quality parameters, quality of service parameters, signal-to-noise ratio (SNR) parameters, or combinations thereof; and
employing the network parameters to form the subsets of wireless components into the two or more nested clusters.

16. The apparatus of claim 14, wherein the memory further retains instructions for statically configuring the master cluster.

17. The apparatus of claim 16, wherein the memory further retains instructions for dynamically configuring the two or more nested clusters for the master cluster.

18. The apparatus of claim 14, wherein the memory further retains instructions for assigning a nested cluster that serves one of the subsets of user devices for a duration of a scheduling decision.

19. The apparatus of claim 18, wherein the one of the subsets of user devices shares data packets and channel state information.

20. The apparatus of claim 19, wherein the data packets and channel state information are shared over a back haul link connecting different cell sites.

21. The apparatus of claim 14, wherein the master cluster restricts user equipment feedback to a subset of nested clusters.

22. The method of claim 1, wherein each of the at least two nested clusters formed within the other master cluster is comprised of a numbers of cells that is always smaller in number than a number of cells of which the other master cluster is comprised.

23. The communications apparatus of claim 14, wherein each of the at least two nested clusters formed within the other master cluster is comprised of a numbers of cells that is always smaller in number than a number of cells of which the other master cluster is comprised.

* * * * *